United States Patent
Hess et al.

(10) Patent No.: US 7,890,487 B1
(45) Date of Patent: Feb. 15, 2011

(54) FACILITATING CLIENT-SIDE DATA-MANAGEMENT FOR WEB-BASED APPLICATIONS

(75) Inventors: Duane S. Hess, Palo Alto, CA (US); Michael H. Tsao, San Mateo, CA (US); Christopher M. Prince, San Francisco, CA (US); Andrew J. Palay, Mountain View, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 11/807,620

(22) Filed: May 29, 2007

(51) Int. Cl.
*G06F 7/00* (2006.01)
*G06F 17/00* (2006.01)
*G06F 17/30* (2006.01)

(52) U.S. Cl. .................. 707/706; 707/712; 707/769; 707/802

(58) Field of Classification Search .............. 7/1–3, 7/10, 104.1; 77/1–3, 10, 104.1; 707/1–3, 707/10, 104.1, 706, 712, 769, 792, 802, 805
See application file for complete search history.

(56) References Cited

U.S. PATENT DOCUMENTS

| | | | | |
|---|---|---|---|---|
| 6,038,562 A | * | 3/2000 | Anjur et al. | 707/10 |
| 6,523,022 B1 | * | 2/2003 | Hobbs | 1/1 |
| 6,714,928 B1 | * | 3/2004 | Calow | 1/1 |
| 6,816,880 B1 | * | 11/2004 | Strandberg et al. | 709/202 |
| 7,246,351 B2 | * | 7/2007 | Bloch et al. | 717/175 |
| 7,523,191 B1 | * | 4/2009 | Thomas et al. | 709/224 |
| 7,584,176 B2 | * | 9/2009 | Chen et al. | 1/1 |
| 2002/0069204 A1 | * | 6/2002 | Kahn et al. | 707/10 |
| 2003/0046276 A1 | * | 3/2003 | Gutierrez et al. | 707/3 |
| 2003/0093400 A1 | * | 5/2003 | Santosuosso | 707/1 |
| 2004/0111727 A1 | * | 6/2004 | Schwarzbauer et al. | 719/310 |
| 2004/0167931 A1 | * | 8/2004 | Han | 707/104.1 |
| 2006/0064411 A1 | * | 3/2006 | Gross et al. | 707/3 |
| 2006/0195461 A1 | * | 8/2006 | Lo et al. | 707/100 |
| 2007/0061266 A1 | * | 3/2007 | Moore et al. | 705/51 |
| 2007/0180020 A1 | * | 8/2007 | Woods | 709/203 |
| 2008/0010298 A1 | * | 1/2008 | Steele et al. | 707/10 |
| 2008/0022267 A1 | * | 1/2008 | Johnson et al. | 717/143 |
| 2008/0270361 A1 | * | 10/2008 | Meyer et al. | 707/3 |

\* cited by examiner

*Primary Examiner*—Don Wong
*Assistant Examiner*—Merilyn P Nguyen
(74) *Attorney, Agent, or Firm*—Park, Vaughan, Fleming & Dowler LLP

(57) ABSTRACT

A database engine embedded within a browser implements a system that facilitates managing client-side data for web-based applications. During operation, the system receives a Uniform Resource Locator (URL) at the browser. The system then retrieves a web-page associated with the URL. Next, the system executes a script associated with the web-page. While executing this script, the system receives a request to open a database. In response to this request, the system uses the database engine to open a database associated with the web-page, wherein the database engine is embedded in the browser. The system then uses the database engine to execute database commands.

22 Claims, 3 Drawing Sheets

FACILITATING CLIENT-SIDE DATA-MANAGEMENT FOR WEB-BASED APPLICATIONS

BACKGROUND

1. Field of the Invention

The present invention relates to the design of web-based applications. More specifically, the present invention relates to a method and apparatus for facilitating client-side data-management for web-based applications.

2. Related Art

During operation, many web-based applications access significant amounts of data. Because of resource constraints and other concerns, a web-server that hosts a web-based application typically stores and maintains this data, which allows the client-side portion of the web-based application to remain relatively "stateless." This causes the web-based application to perform many actions sub-optimally because additional processing power and bandwidth is required to maintain client-specific data at the web-server instead of on the client.

One solution to the above problem is to use "cookies" to store data on the client. However, this technique has limitations. First, cookies can only store a limited amount of data, which limits their usefulness for applications which store significant amounts of data. Second, many users are suspicious of cookies, and therefore do not permit cookies to be stored on their local client systems. Furthermore, clients often do not store cookies persistently beyond a limited time-period, which reduces the usefulness of cookies for storing data for web-based applications which a user accesses often.

Hence, what is needed is a method and apparatus for managing client-side data for web-based applications without the above-described problems.

SUMMARY

One embodiment of the present invention provides a system that facilitates managing client-side data for web-based applications. During operation, the system receives a Uniform Resource Locator (URL) at a browser. The system then retrieves a web-page associated with the URL. Next, the system executes a script associated with the web-page. While executing this script, the system receives a request to open a database. In response to this request, the system uses a database engine to open a database associated with the web-page, wherein the database engine is embedded in the browser. The system then uses the database engine to execute database commands.

In a variation on this embodiment, the database is located on a local machine which hosts the browser.

In a variation on this embodiment, the system receives a request to create the database. In response to the request, the system creates the database. The system then associates the database with the web-page.

In a variation on this embodiment, the request to open the database includes a database identifier. In this variation, the system uses the database engine to open a database which is associated with the database identifier and the web-page.

In a variation on this embodiment, receiving the database command involves receiving a script command that is bound to the database command.

In a variation on this embodiment, the database is associated with a domain which hosts the web-page.

In a variation on this embodiment, a web-based application, which is associated with the domain, includes the script that enables the web-based application to access the database.

In a further variation, access to the database is limited to the web-based application.

In a further variation, the system sends a result of executing the database command to the web-based application which enables the web-based application to modify the web-page based on the result.

In a variation on this embodiment, a second web-based application which is associated with the domain can access the database.

In a variation on this embodiment, executing the database command on the database can involve accessing the database using a second browser; accessing the database using multiple tabs associated with the browser; accessing the database using multiple threads associated with the browser; and accessing the database using multiple processes associated with the browser.

DETAILED DESCRIPTION

Figure 1:
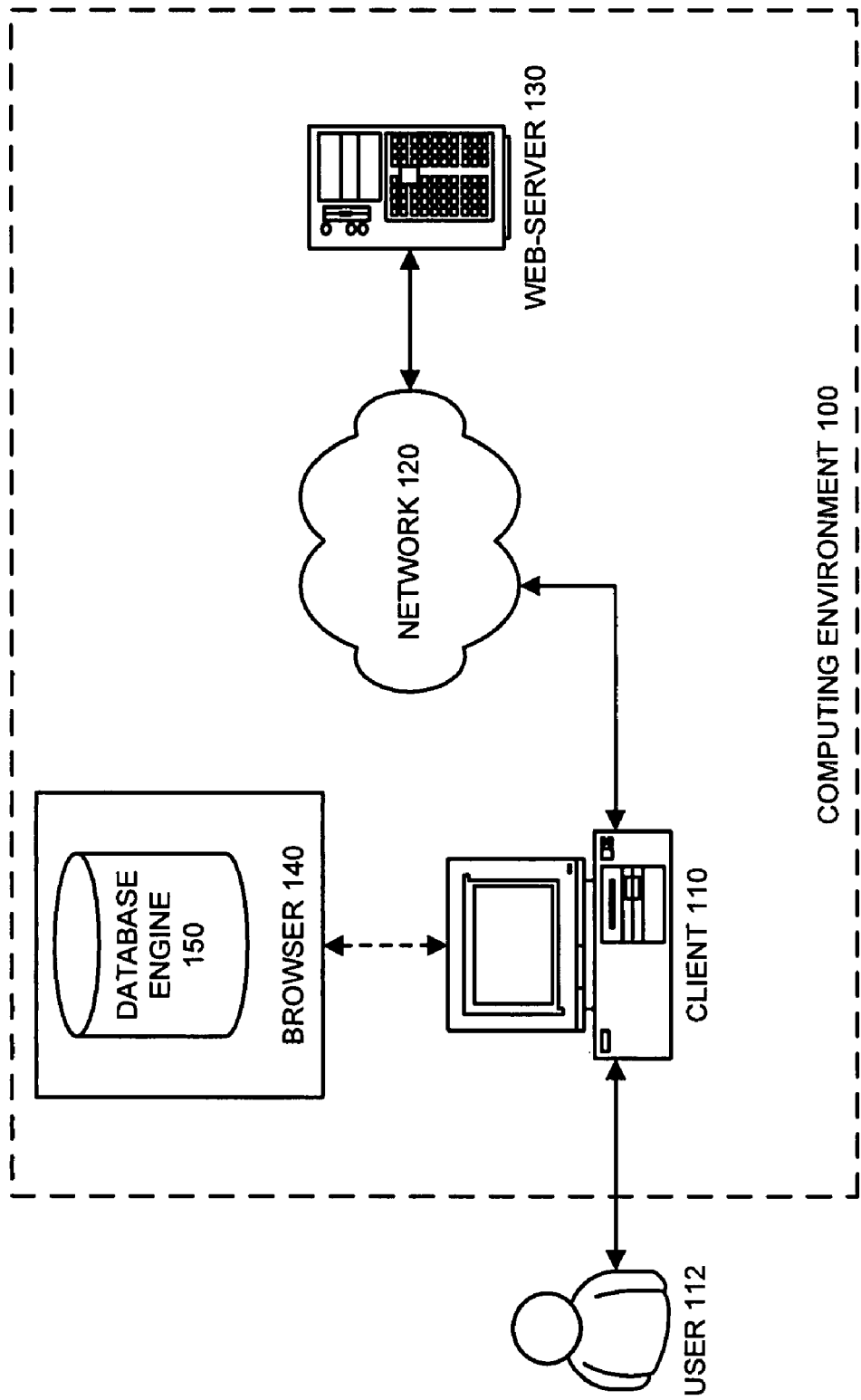
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a browser that includes an embedded database engine. Furthermore, the browser includes a script Application Programmer Interface (API), such as a JavaScript API, that is bound to a set of database commands. This enables a web-based application to interact with the database engine via the script API.

In one embodiment of the present invention, the web-based application can include: a web-page; a web-site; a client-server application; and any other application that can interact with the browser.

In one embodiment of the present invention, a server, web-server, a client, or any other computing system can host the web-based application and/or the browser.

In one embodiment of the present invention, the computing system that hosts the browser can also host the web-based application.

In one embodiment of the present invention, different computing systems can host the browser and the web-based application.

In one embodiment of the present invention, the browser uses a binding interface to enable the web-based application to communicate with the database engine. In this embodiment, a user, a client, or an application can install the database engine and can expose the binding interface associated with the database engine without requiring modifications to the design of the browser. To accomplish this, the user, the client or the application loads the binding interface and the database engine as a plug-in or an extension to the browser. (Note that most existing browsers can load plug-ins or extensions by default and therefore it is not necessary to modify the design of the browser to enable the browser to load the binding interface and the database engine. Furthermore, note that the binding interface can bind existing script commands associated with the browser to database commands associated with the database engine.)

In one embodiment of the present invention, the binding interface can provide additional commands which are bound to database commands associated with the database engine.

In one embodiment of the present invention, the set of database commands are part of a query language, such as Structured Query Language (SQL).

In one embodiment of the present invention, the browser can use the database engine to create a database that is associated with a web-based application. This database can store data persistently on a client for a definite or indefinite period of time. Note that the amount of data that the database can store is limited only by the resources available to the client.

In one embodiment of the present invention, the database engine is only accessible via the browser.

In one embodiment of the present invention, the database is only accessible via the database engine embedded in the browser.

In one embodiment of the present invention, only the web-based application associated with a specific database can access the specific database.

In one embodiment of the present invention, a subset of web-based applications associated with a domain that is associated with a given database can access the given database.

In one embodiment of the present invention, the browser receives a request from a web-based application to create a database. In response to this request, the browser uses the database engine to create the database, and then associates the database with the web-based application. In this embodiment, the browser selects a default name for the database based on a pre-defined configuration.

In one embodiment of the present invention, the web-based application specifies a name for the database.

In one embodiment of the present invention, the browser receives a script command that is bound to a database command from the web-based application. In response to receiving this script command, the browser uses the database engine to execute the corresponding database command on a database associated with the web-based application. In this embodiment, the browser executes the database command on a default database associated with the web-based application.

In one embodiment of the present invention, the web-based application specifies which database to execute the database command on. In this embodiment, the browser determines if the specified database is associated with the web-based application before executing the database command. If the specified database is not associated with the web-based application, the browser rejects the database command and does not execute the database command on the specified database.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, network 120, web-server 130, browser 140, and database engine 150.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Web-server 130 can generally include any computational node including a mechanism for servicing requests from a client for computational and/or data storage resources. Furthermore, web-server 130 can generally include any system that can host web-pages, web-sites, web-based applications, or server-side portions of client-server applications.

Browser 140 can generally include any application that can display web-pages, such as a web-browser. Furthermore, browser 140 can generally include any system that can interact with web-pages, web-sites, web-based applications, or client-server applications.

In one embodiment of the present invention, client 110 hosts browser 140.

Database engine 150 can generally include any type of system for storing data in non-volatile storage. This includes, but is not limited to, systems based upon magnetic, optical, and magneto-optical storage devices, as well as storage devices based on flash memory and/or battery-backed up memory. Furthermore, database engine 150 can generally include any system for interacting with and managing a database. Note that database engine 150 can include a Database Management System (DBMS), which facilitates managing a database.

In one embodiment of the present invention, a database can include any structured collection of data. In this embodiment, user 112 or client 110 accesses the database via database engine 150, which user 112 or client 110 accesses via browser 140. Note that database engine 150 can manage multiple databases.

In one embodiment of the present invention, database engine 150 can include any database engine that can process a query language based command, such as a Structured Query Language (SQL) command.

In one embodiment of the present invention, database engine 150 is embedded within browser 140. In this embodiment, applications (both web-based and non-web-based) can only access database engine 150 via browser 140.

In one embodiment of the present invention, only web-based applications can access database engine 150.

In one embodiment of the present invention, only authorized applications can access database engine 150. In this embodiment, browser 140 can use any authorization mechanism, such as digital certificates, to determine if an application has authorization to access database engine 150.

In one embodiment of the present invention, user 112 specifies which applications are authorized to access database engine 150.

In one embodiment of the present invention, browser 140 is a generic browser that can interact with browser plug-ins. In this embodiment, browser 140 includes a plug-in that enables web-server 130 to interact with database engine 150 via browser 140. To do so, web-server 130 (or a web-page or web-based application that web-server 130 hosts) executes script commands on browser 140 which are bound to database commands, such as SQL commands.

In one embodiment of the present invention, browser 140 includes an interface which enables web-server 130 to interact with database engine 150. Note that this interface can provide commands which enable web-server 130 to directly interact with database engine 150.

In one embodiment of the present interface, the interface provides script commands which are bound to database commands associated with database engine 150. In this embodiment, the script commands may perform additional operations, such as determining if web-server 130 is authorized to access database engine 150 before enabling web-server 130 to interact with database engine 150.

In one embodiment of the present invention, client 110 hosts database engine 150 and any database associated with database engine 150.

User 112 can generally include an individual; a group of individuals; an organization; a group of organizations; a computing system; a group of computing systems; or any other entity that can interact with computing environment 100.

In one embodiment of the present invention, user 112 can be a client.

Executing a Database Operation

Figure 2:
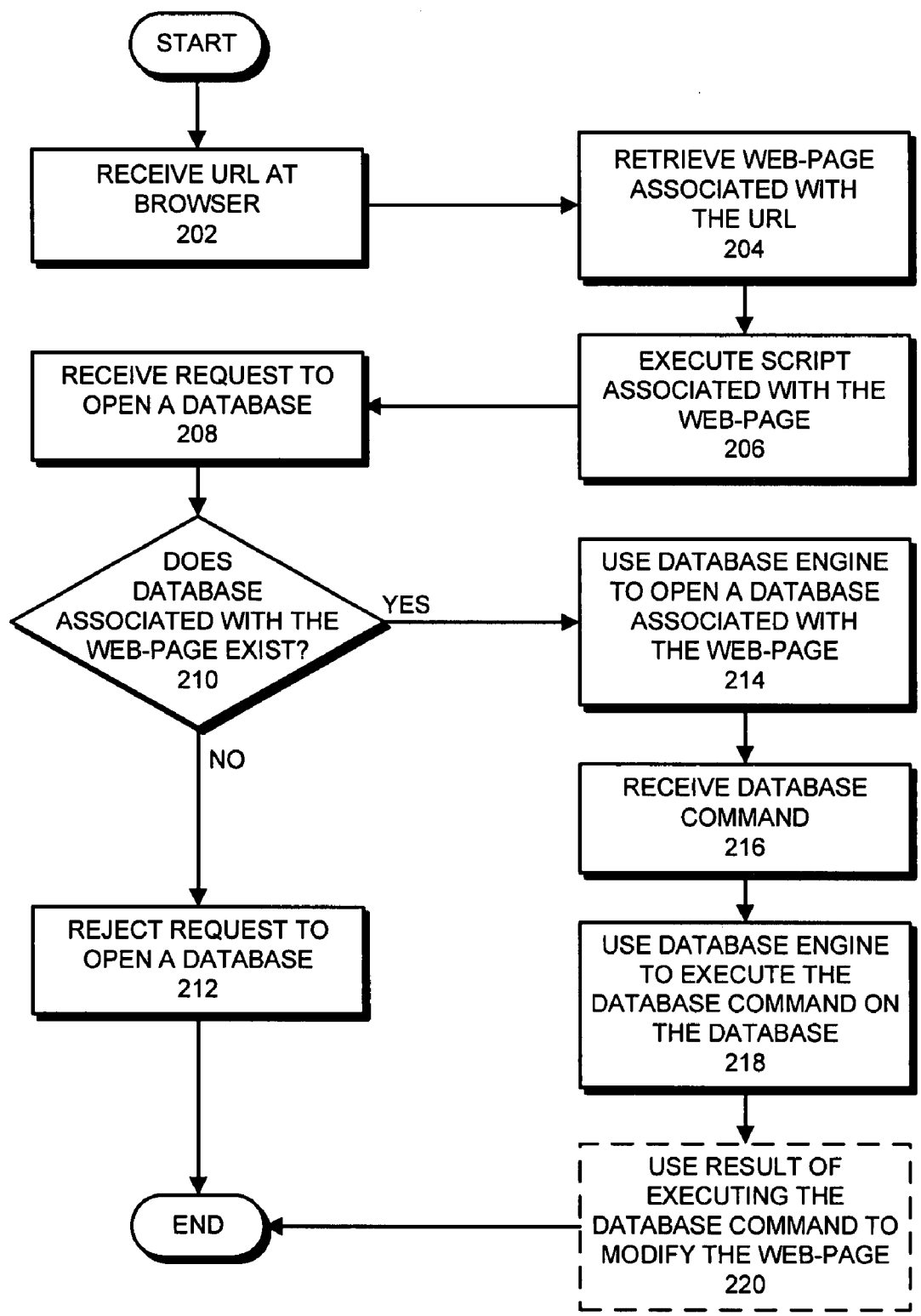
FIG. 2 presents a flow chart illustrating a process for executing a database operation in accordance with an embodiment of the present invention.

FIG. 2 presents a flow chart illustrating a process for executing a database operation in accordance with an embodiment of the present invention. The process begins when browser 140 receives a Uniform Resource Locator (URL) from user 112 (operation 202).

In one embodiment of the present invention, browser 140 can receive the URL from an application, client 110, a server, or any other system that can send a URL to browser 140.

Next, browser 140 retrieves a web-page from web-server 130 associated with the URL (operation 204).

In one embodiment of the present invention, browser 140 interacts with a web-based application associated with the URL. Note that web-server 130 hosts the web-based application.

In one embodiment of the present invention, client 110 can host the web-page and/or web-based application.

Browser 140 then executes a script associated with the web-page (operation 206). Note that a programmer can use any scripting language to create the script.

In one embodiment of the present invention, the script can be any web-based application that can interact with browser 140.

In one embodiment of the present invention, a web-based application can include any script which enables the web-based application to access a database associated with the web-based application.

While executing the script, browser 140 receives a request to open a database (operation 208). Note that browser 140 can receive this request from a web-page or a web-based application that web-server 130 hosts. Browser 140 then determines if a database associated with the web-page exists on client 110 (operation 210). If not, browser 140 rejects the request to open a database (operation 212).

In one embodiment of the present invention, if a database associated with the web-page does not exist on client 110, browser 140 uses database engine 150 to create a database associated with the web-page. Browser 140 then performs operation 214.

In one embodiment of the present invention, the request to open a database includes a database identifier associated with a database. In this embodiment, browser 140 determines if a database exists which is associated with both the database identifier and the web-page. If not, browser 140 performs operation 212. Note that if a database exists which is associated with the database identifier, but which is not associated with the web-page, browser 140 rejects the request to open the database. If browser 140 determines that a database exists which is associated with both the database identifier and the web-page, browser 140 performs operation 214.

In one embodiment of the present invention, determining if a database exists that is associated with a web-page involves determining if a database exists that is associated with a domain which is associated the web-page.

If browser 140 determines that a database associated with the web-page exists on client 110, then browser 140 uses database engine 150 to open the database associated with the web-page (operation 214). Browser 140 then receives a database command from the web-page (operation 216). Note that the script can include the database command.

In one embodiment of the present invention, receiving a database command involves receiving a script command that is bound to the database command.

Browser 140 then uses database engine 150 to execute the database command on the database which is associated with the web-page (operation 218).

In one embodiment of the present invention, executing the database command can involve: accessing the database using a second browser; accessing the database using multiple tabs associated with browser 140; accessing the database using multiple threads associated with browser 140; accessing the database using multiple processes associated with browser 140; and any other process that can facilitate browser 140 executing the database command, or using database engine 150 to execute the database command on a database.

Next, browser 140 uses the result of executing the database command to modify the web-page (operation 220). Note that operation 220 is optional as is illustrated by the dashed lines surrounding operation 220.

In one embodiment of the present invention, browser 140 sends the result of executing the database command to a web-based application which enables the web-based application to modify the web-page based on the result.

In one embodiment of the present invention, browser 140 sends the result of executing the database command to web-server 130.

In one embodiment of the present invention, browser 140 sends the result of executing the database command to a third-party server.

Creating a Database

Figure 3:
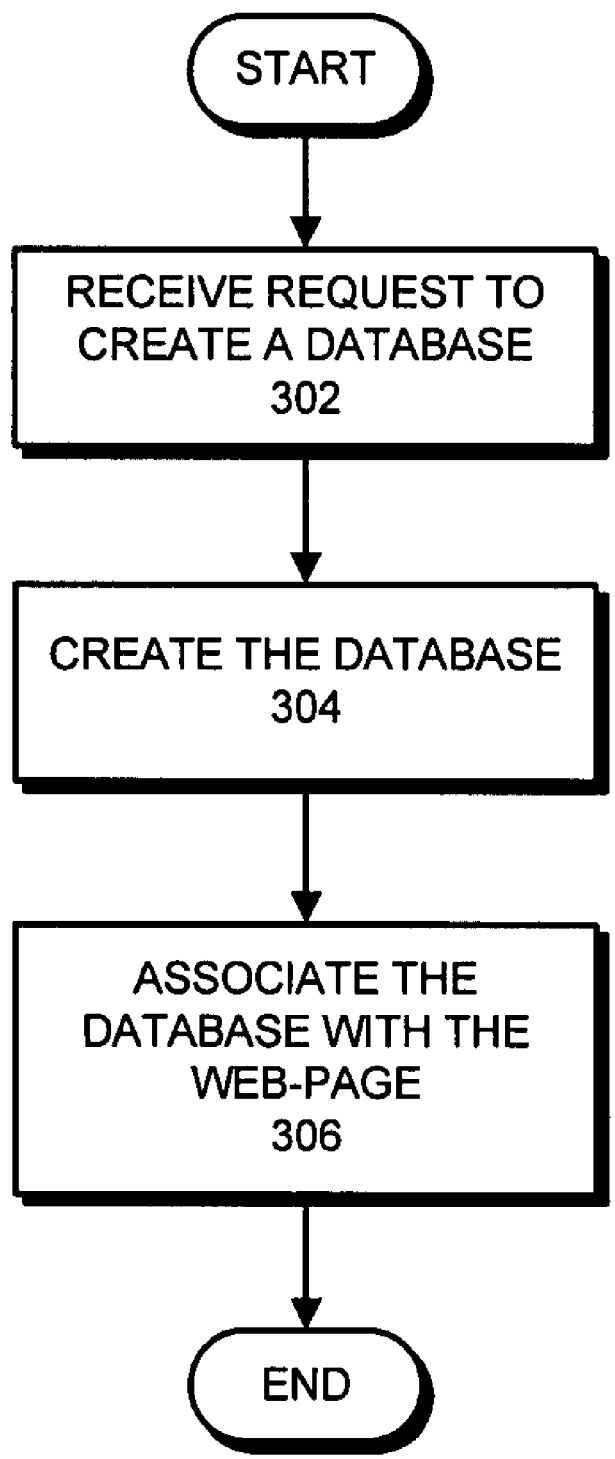
FIG. 3 presents a flow chart illustrating a process for creating a database in accordance with an embodiment of the present invention.

FIG. 3 presents a flow chart illustrating a process for creating a database in accordance with an embodiment of the present invention. The process begins when browser 140 receives a request to create a database from a web-page that web-server 130 hosts (operation 302). Browser 140 then uses database engine 150 to create the database (operation 304). Note that browser 140 can use a default pre-configured name to create the database. Furthermore, note that user 112 or a developer who created browser 140 can specify the default pre-configured name.

In one embodiment of the present invention, the request to create the database includes a database identifier which specifies a name for the database.

In one embodiment of the present invention, browser 140 receives the request to create the database from web-server 140; a web-based application that web-server 140 hosts; client 110; or any other system that can send a request to create the database.

Next, browser 140 associates the database with the web-page (operation 306).

In one embodiment of the present invention, browser 140 associates the database with web-server 130; a web-based application that web-server 130 hosts; a domain that includes the web-page, web-server 130, or the web-based application; an Internet Protocol (IP) address; or any other subject or characteristic that browser 140 can associate with the database.

In one embodiment of the present invention, access to the database is limited to the web-page.

In one embodiment of the present invention, access to the database is limited to the system or the application (which can be either web-based or non-web-based) that sent the request to create the database.

In one embodiment of the present invention, access to the database is limited to a domain associated with the web-page or the application that sent the request to create the database. In this embodiment, a second web-page or web-based application, which did not send the request to create the database, but which is associated with the domain, can access the database.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating client-side data management for web-based applications, the method comprising:
   receiving a Uniform Resource Locator (URL) at a browser hosted on a client machine;
   retrieving a web page associated with the URL;
   executing a script associated with the web page;
   receiving a request to open a database connection;
   in response to the request, using a database engine that is embedded in the browser to open the database connection to a database on the client machine that is associated with the web page;
   retrieving a database command from the web page; and
   using, at the browser, a binding interface associated with the database engine to execute the database command on the database, wherein the binding interface provides script commands which are bound to database commands associated with the database engine embedded in the browser.

2. The method of claim 1, further comprising:
   receiving a request to create the database;
   in response to the request, creating the database; and
   associating the database with the web page.

3. The method of claim 1, wherein the request to open the database includes a database identifier, and wherein the method further comprises using the database engine to open a database which is associated with the database identifier and the web page.

4. The method of claim 1, wherein receiving the database command involves receiving a script command that is bound to the database command.

5. The method of claim 1, wherein the database is associated with a domain which hosts the web page.

6. The method of claim 5, wherein a web-based application, which is associated with the domain, includes the script that enables the web-based application to access the database.

7. The method of claim 6, wherein access to the database is limited to the web-based application.

8. The method of claim 6, further comprising sending a result from execution of the database command to the web-based application which facilitates the web-based application to modify the web page based on the result.

9. The method of claim 5, wherein a second web-based application which is associated with the domain can access the database.

10. The method of claim 1, wherein executing the database command on the database can involve:
    accessing the database using a second browser;
    accessing the database using multiple tabs associated with the browser;
    accessing the database using multiple threads associated with the browser; and
    accessing the database using multiple processes associated with the browser.

11. A non-transitory computer-readable storage medium storing instructions that when executed by a computer cause the computer to perform a method for facilitating client-side data management for web-based applications, the method comprising:
    receiving a Uniform Resource Locator (URL) at a browser hosted on a client machine;
    retrieving a web page associated with the URL;
    executing a script associated with the web page; receiving a request to open a database connection; in response to the request, using a database engine that is embedded in the browser to open the database connection to a database on the client machine associated with the web page;
    retrieving a database command from the web page; and
    using, at the browser, a binding interface associated with the database engine to execute the database command on the database, wherein the binding interface provides script commands which are bound to database commands associated with the database engine embedded in the browser.

12. The computer-readable storage medium of claim 11, wherein the method further comprises:
    receiving a request to create the database;
    in response to the request, creating the database; and
    associating the database with the web page.

13. The computer-readable storage medium of claim 11, wherein the request to open the database includes a database identifier, and wherein the method further comprises using the database engine to open a database which is associated with the database identifier and the web page.

14. The computer-readable storage medium of claim 11, wherein receiving the database command involves receiving a script command that is bound to the database command.

15. The computer-readable storage medium of claim 11, wherein the database is associated with a domain which hosts the web page.

16. The computer-readable storage medium of claim 15, wherein a web-based application, which is associated with the domain, includes the script that enables the web-based application to access the database.

17. The computer-readable storage medium of claim 16, wherein access to the database is limited to the web-based application.

18. The computer-readable storage medium of claim 16, wherein the method further comprises sending a result from execution of the database command to the web-based application which facilitates the web-based application to modify the web page based on the result.

19. The computer-readable storage medium of claim 15, wherein a second web-based application associated with the domain can access the database.

20. The computer-readable storage medium of claim 11, wherein executing the database command on the database can involve:

accessing the database using a second browser;

accessing the database using multiple tabs associated with the browser;

accessing the database using multiple threads associated with the browser; and accessing the database using multiple processes associated with the browser.

21. An apparatus that facilitates client-side data management for web-based applications, comprising:

a microprocessor;

a memory;

a receiving mechanism configured to receive a Uniform Resource Locator (URL) at a browser hosted on a client machine, wherein the receiving mechanism is further configured to receive a request to open a database connection;

a page-retrieval mechanism configured to retrieve a web page associated with the URL;

a script-execution mechanism configured to execute a script associated with the web page;

a database engine that is embedded in the browser and configured to open the database connection to a database on the client machine that is associated with the web page in response to the request; a command-retrieval mechanism configured to retrieve a database command from the web page; and a database-execution mechanism that is embedded in the browser and configured to use a binding interface associated with the database engine to execute the database command on the database, wherein the binding interface provides script commands which are bound to database commands associated with the database engine embedded in the browser.

22. The apparatus of claim 21, wherein the receiving mechanism is further configured to receive a request to create a database, and wherein the apparatus further comprises:

a creation mechanism configured to create the database; and an association mechanism configured to associate the database with the web page.

* * * * *